Feb. 27, 1934.                C. HOLLERITH                1,948,816
                                FAN BEARING
                        Filed June 20, 1930        4 Sheets-Sheet 1

INVENTOR
Charles Hollerith
BY Ira J. Adams
ATTORNEY

Feb. 27, 1934.   C. HOLLERITH   1,948,816
FAN BEARING
Filed June 20, 1930   4 Sheets-Sheet 2
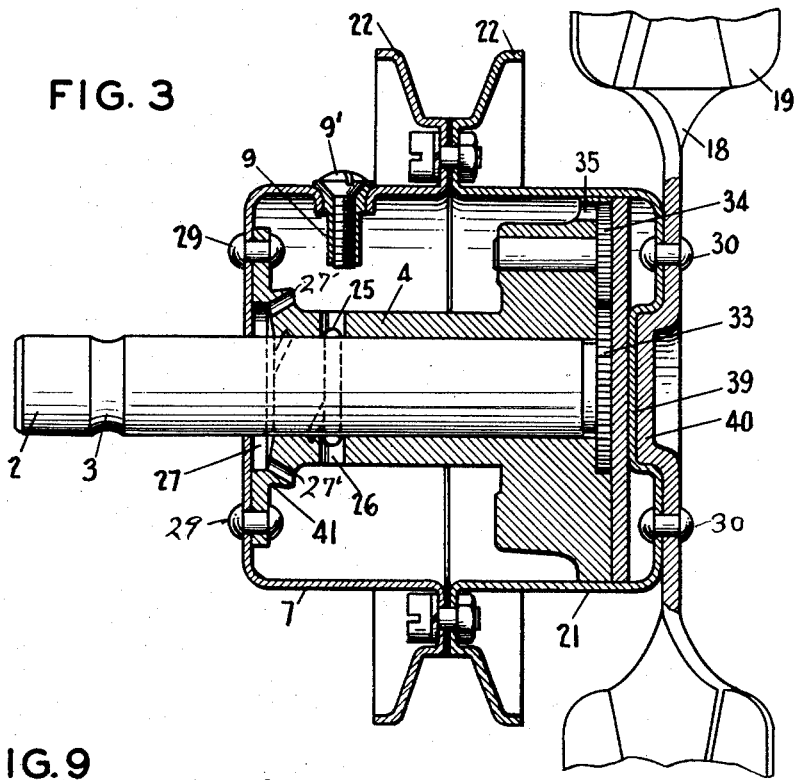
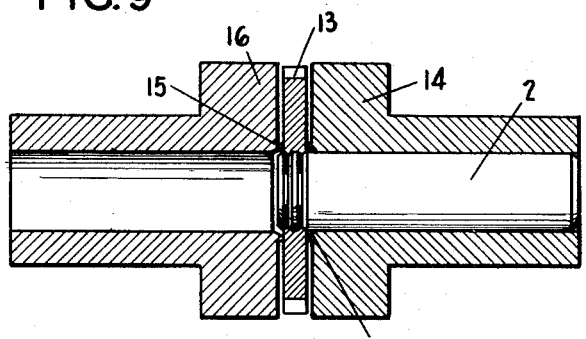
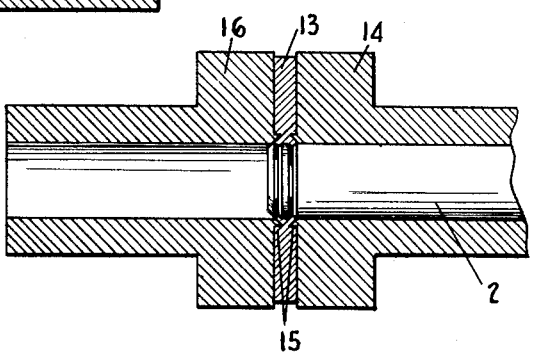
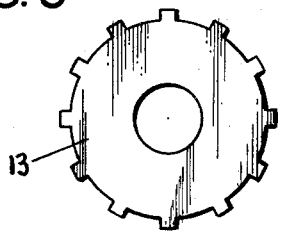
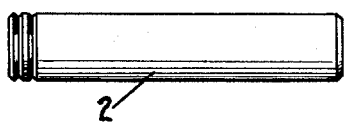

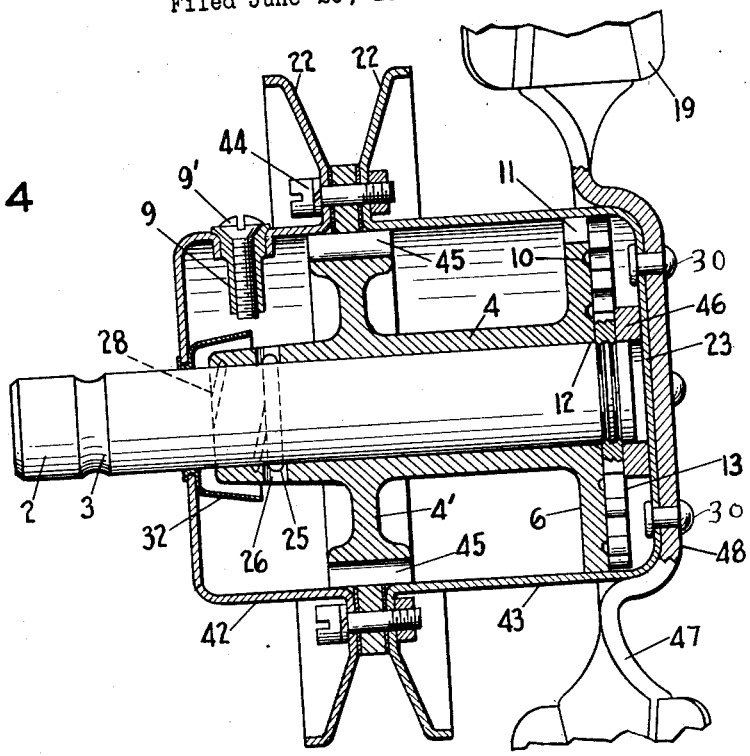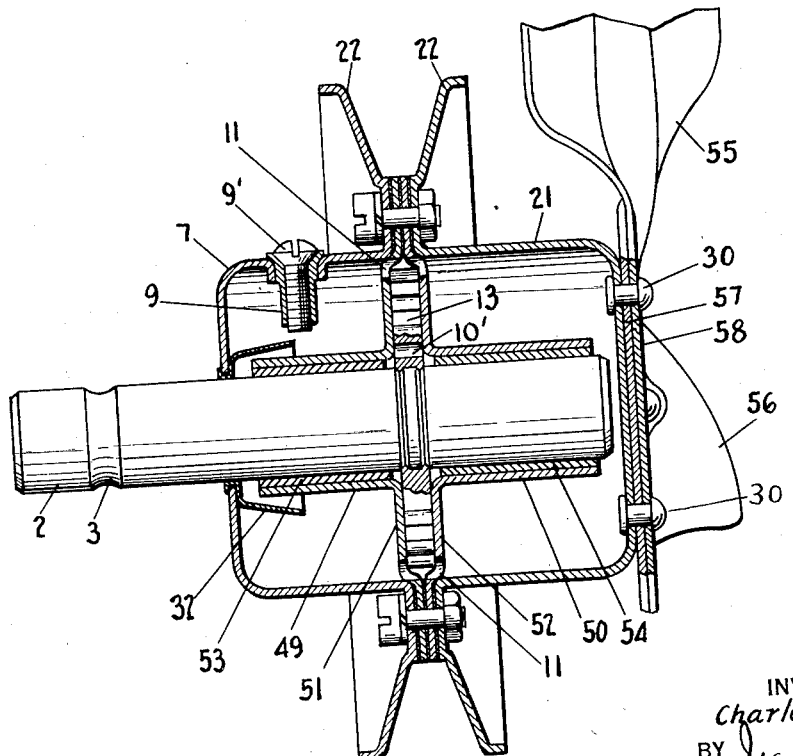

Feb. 27, 1934.          C. HOLLERITH          1,948,816
                          FAN BEARING
                      Filed June 20, 1930          4 Sheets-Sheet 4

INVENTOR
*Charles Hollerith*
BY *Ira J Adams*
ATTORNEY

Patented Feb. 27, 1934

1,948,816

UNITED STATES PATENT OFFICE 1,948,816

FAN BEARING

Charles Hollerith, Jackson, Mich., assignor to Automotive Fan & Bearing Co., a corporation of Michigan Application June 20, 1930. Serial No. 462,447

10 Claims. (Cl. 64—17)

This invention relates to automobile fan pulleys. An object of the invention is to construct a fan pulley of light weight and strong construction with oiling means to lubricate the bearing.

Another object of the invention is to so construct the bearing hub or housing and associate parts as to reduce the number of parts used and to reduce the number of joints and gaskets necessary in order to prevent leakage of oil.

Still another object of the invention is to provide positioning means on the fan blades or spider to accurately align the fan in respect to the bearing housing.

Another object of the invention is to stamp the cup shaped hub members of the lubricant container with flanges adapted to be bolted together to form the pulley.

Another object of the invention is to secure the fan spider or blades directly to the housing or hub member.

Another object is to locate the oiling means in the intermediate portion of the fan bearing instead of at the side.

Still another object of the invention is to locate the rivets or bolts between the housing and the fan spider or blades inside the annular space occupied by the oil when it is forced outward by centrifugal force.

A further object is to use a special method of riveting the pump disc to the stub axle.

Other objects will appear in the appended description, reference being had to the drawings, in which:

Fig. 3 is a still further modification showing a different form of centering means for the fan spider.

Fig. 4 shows among other things a separable pulley arrangement having a modified form of connecting means between the outer hub member and the inner bearing member.

Fig. 5 is a further modification in which the oiling means is located in the center of the pulley.

Fig. 8 is a view of the oil washer or disc.

Fig. 9 shows a special manner in which the oil disc is attached to the stub shaft.

Fig. 10 shows the position of the dies when the oil disc has been riveted or swaged to the stub shaft.

Fig. 11 is a view of the stub shaft.

Throughout the drawings the same reference characters are applied to similar or analogous parts.

Figure 1:
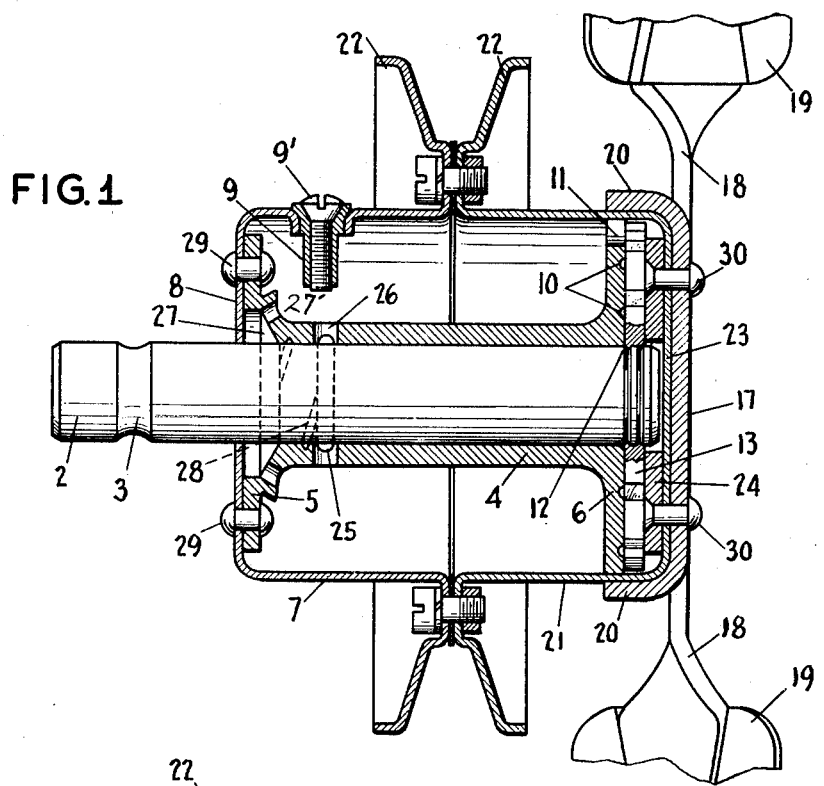
Fig. 1 is a sectional elevation of one form of the fan assembly.

Referring to the drawings, in Fig. 1 a stub shaft 2 has a groove 3 on the inner end adapted to secure the shaft by means of a bolt when inserted in a bracket attached to the automobile engine. Around the stub shaft rotatably but snugly fits a bearing sleeve 4 having an inner annular flange 5 and an outer annular flange 6.

A cup-shaped pulley member 7 drawn preferably from sheet steel has a flange 22 extending outwardly from its rim and has a base 8 riveted at a number of points around the circumference to the inner flange 5. This pulley member 7 has an oil tube 9 closed by a removable screw plug 9', as described in Patent 1,712,263 of T. B. Funk, May 7, 1929. The flange 6 of the bearing sleeve has a spiral groove 10 cut in its front surface and leading from an opening 11 at the periphery of the flange to the bore 12 fitting over the stubshaft 2. An oil washer 13 (Figs. 1 and 8) preferably having one or more notches in its periphery and adapted to move relatively past the oil hole 11 is riveted or swaged to the stubshaft 2 by a special process.

To accomplish the riveting the stubshaft (Fig. 11) has one or more grooves, preferably two, or other cavities formed in its surface adjacent the desired location of the disc. To secure the oil disc to the stubshaft, such disc is pushed on the shaft 2 and located with its side substantially in line with the two grooves cut in the shaft. A die 14 having a cutting bead 15 positioned around the central opening, is slid over the shaft 2 until this bead is in position against the inner side of the oil disc 13 (Fig. 9). A similar die 16 having a similar cutting edge is then placed in position against the outer surface of oil ring 13. Pressure is applied to these two dies in a suitable press and the cutting edges enter the oil disc 13 as shown in Fig. 10. This swages or rivets the metal of the disc tightly down into the grooves cut in the stubshaft 2. The dies are then removed with the oil disc rigidly fastened to the shaft.

By this method of fastening the disc to the shaft a construction is obtained that is fully as solid as if the disc were integral with the shaft. This method assures that the disc is perfectly aligned in a plane perpendicular to the axis of the shaft because the die 14 snugly fits the shaft 2 and pressure from the perpendicular face of die 16 forces the washer 13 firmly against the perpendicular faces of the dies 14. The disc thus would be forced by pressure into perfect alignment even if it were originally cupped or warped out of true. The disc may be riveted to the intermediate portion of the shaft in Figs. 5 and 6 in the same manner with the shaft extending further into the die 16.

The spider 17 has a plurality of arms 18 adapted to be riveted to fan blades 19. Any number of blades may be riveted to the fan spider equal distances around the circumference but this forms no part of the invention, so only a portion of two fan blades are shown. The spider 17 has lugs 20 stamped from its surface at a plurality of points around its circumference so as to fit over in accurate alignment with the second cup-shaped pulley member 21. This pulley member is preferably stamped from sheet metal in the same way as the pulley member 7 so as to have upwardly extending flanges 22 at its rim. The front portion of the stamping 21 is entirely closed by the flat base portion 23.

After the fan spider 17 has been fitted over the cup shaped member 21 a thrust disc 24 is placed inside of the cup member 21 and this disc 24, the pulley section 21 and the spider section 17, are riveted together at a plurality of places around the circumference. To assemble the pulley after the riveting has been completed as already described, the stubshaft 2 and its attached oil disc 24 is placed in position inside the pumping sleeve 4. The pulley section 21 and the attached fan spider is then bolted to the pulley section 7 at a plurality of places around the circumference, a gasket being placed between the parts to seal the junction against leakage of oil.

In this construction there is only one junction that need be sealed against the leakage of oil and that is the one between the pulley halves.

When this fan is assembled on the automobile engine, screw 9' is removed and a supply of oil added, after which the pulley is rotated 180° to let the excess oil drain through the tube 9. The height of this tube is such that the correct amount of oil is retained in the bearing in this position with the screw plug out. The plug is then screwed into position and this amount of oil will remain for many thousands of miles of travel of the automobile.

The fan is rotated by a suitable belt fitting between the pulley flanges 22 and attached to some rotating pulley member on the engine. Under centrifugal force the oil in the reservoir is thrown out into an annulus against the inner surface of the hub members 7 and 21. Oil thus enters the hole 11 and is drawn down along the spiral groove 10 by relative rotation between the oil disc 24 and the flange 8. The oil is thus brought to the bore 12 of the sleeve 4 and is forced in a thin film around the stubshaft to thoroughly lubricate it. The oil is forced along the shaft to the annular groove 25 having one or more holes 26 leading to the lubricating chamber. Centrifugal force throws this oil outward where it joins the oil located in an annulus about the inside of the pulley housing. Oil is prevented from flowing along the shaft into the space 27 by oil groove 28 cut into bearing surface of the center end of the sleeve member 4. This draws the oil into the groove 25. However, if any oil should tend to slowly accumulate in the space 27 it would drain out the holes 27' while the pulley is stationary or be thrown out such holes while the pulley is rotating.

One of the particular improvements in this invention is the location of the rivets 29 and 30 inside of the space where the annulus of oil will be located. Therefore, if any of these rivets happen to be loose they will not be located in the oil annulus and consequently the oil will not seep out around the rivets by centrifugal force.

Figure 2:
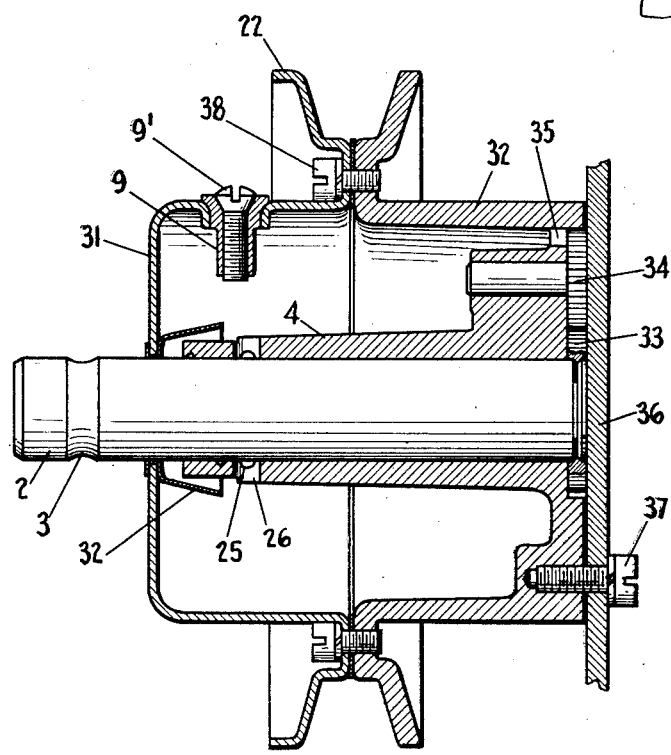
Fig. 2 is a sectional elevation of another form of fan assembly.

In Fig. 2 the center pulley section 31 is formed substantially as in Fig. 1 except that it has an oil fling 32 attached thereto. This fling or guard is described and claimed in the patent of T. B. Funk, No. 1,743,712, January 14, 1930. The remaining pulley section 32 in this case is cast integral with the bearing sleeve 4. In this particular case the oiling means consists of a gear 33 swaged on to the stubshaft 2 by the process already described. This gear meshes with another gear 34, the teeth of which rotate past oil hole 35 in contact with the annulus of oil located on the inside of the hub when the pulley is rotating. This particular form of gear pump is not claimed herein as it is described and claimed in the patent of T. B. Funk, No. 1,370,422, March 1, 1921, and further description of this form of pump need not be given herein. In this particular modification the fan spider or extensions of the fan blades 36 are fastened directly to the integral flange between the sleeve 4 and the pulley hub 32 by means of a plurality of machine screws 37 located around the circumference. The cast pulley member 32 is bolted to the sheet metal section 31 by means of machine screws or bolts 38, an appropriate gasket being located between the parts to prevent leakage of oil. A gasket is also used between the fan spider 36 and the flange of the bearing member 4.

In Fig. 3 the pulley members 7 and 21 are similar to those of Fig. 1 except that the front surface of section 21 has a circular counter sunk portion 39 adapted to receive a circular protuberance 40 punched from the fan spider. The parts 39 and 40 are centrally located in respect to the stub shaft 2 and they properly align the fan spider and blades. The oiling gears in this modification are similar to those shown in Fig. 2. The rivets 29 and 30 in this modification are also located inside of the space occupied by the annulus of oil. Also, in this figure as in Fig. 1, the annular groove 41 prevents the oil from flowing into the space 27 when the annulus of oil collapses as the engine is stopped. This prevents leakage outside of the pulley section 7 around the stub shaft 2.

In Fig. 4 the pulley sections 42, 43 are stamped or drawn from sheet metal in the way described in connection with Fig. 1 but they are proportioned somewhat differently, as shown in the drawing. In this case the bearing member 4 has a central flange 4' adapted to fit in between the pulley rims 22 and between which it is clamped at a plurality of places around its circumference by bolts 44 with the usual gasket between.

Communication between the two center oil chambers formed by this arrangement is provided for by holes 45. The oil ring 13 in this case and the cooperating grooves function in the same way as described in connection with Fig. 1, but in this case a thrust washer 46 fits over the extended end of the stubshaft to bear against the front 23 of the pulley section 43. This washer may be of fibre, brass or any other desirable material and it may be loosely fitted on the extended end of the stub shaft.

In this modification the fan spider 47 is drawn or stamped so as to have a cup shaped portion 48 that accurately fits over the end of the pulley section 43. This accurately aligns the fan. The spider is riveted to the portion 23 of the pulley section at a plurality of places around its circumference and below the space where the annulus of oil is located when the pulley is rotating.

Other parts of this pulley are similar to those of previously described figures.

Fig. 5 has pulley sections 7 and 21 similar to those of Fig. 1 but the bearing sleeve is made up from two sheet metal stampings 49 and 50 and the oil ring 24 of Fig. 1 is now located in between these two stampings. The bearing stampings 49 and 50 each have flanges 51 and 52 adapted to extend out between the pulley flanges 22. In this particular case three gaskets are necessary to seal the junction against leakage of oil. The oil ring 13 is swaged to the stubshaft 2 as previously described. Inside the sheet metal stampings 49 and 50 are arranged bushings 53, 54 of bronze, or other bearing metal. In this construction as well as in the others the thrust of the pulley against the stub shaft in both directions is taken by the oil disc 13.

In Fig. 5 two pairs of fan blades 55, 56 have central integral strips 57, 58, crossing each other at right angles and riveted to the front surface of the pulley section 21 by appropriate rivets 30 located inwardly from the space occupied by the oil.

Figure 6:
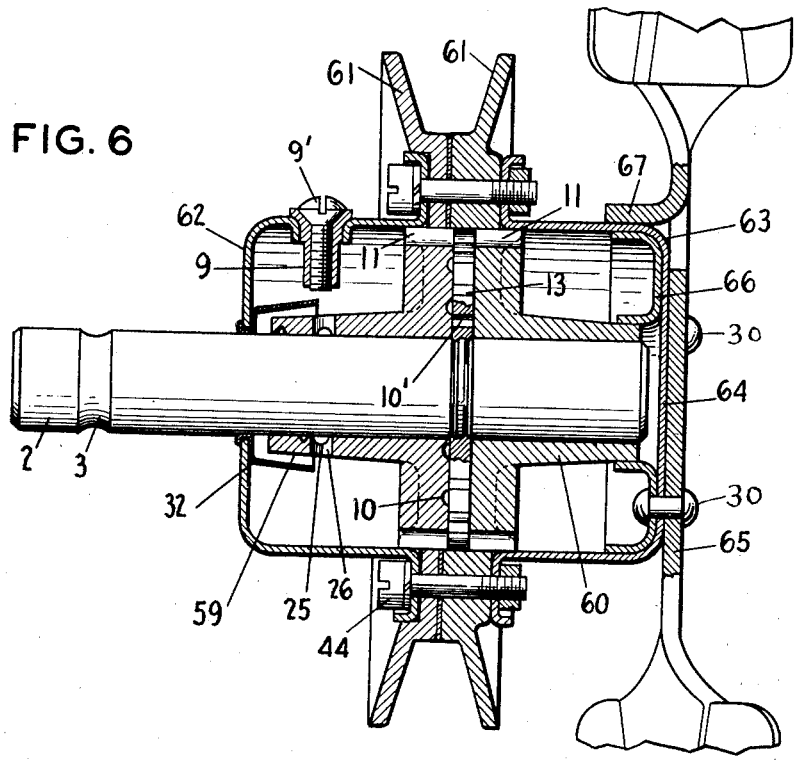
Fig. 6 is a still further modification where the oiling means is in the central portion of the pulley.

In Fig. 6, the bearing member consists of two parts, preferably castings 59 and 60, each having an integral flange 61 adapted to form the pulley of the fan. These flanges have the usual hole 11 for conveying the oil to the oil disc 13 located in a recess between the two flanges. One or both of these flanges also has the spiral oil groove 10 in its surface. When one groove only is used the disc 23 has an oil by-pass hole 10' to feed oil from the groove 10 to bearing 60. Two cup shaped members 62, 63, are bolted to the flanges to form the outer housing of the bearing. One of these cup members has a hole for reception of the inner end of the stub shaft and the other has a flat portion 64 to receive the spider 65 to which it is riveted, as previously described. To align and rigidly hold the front end of the cup member 63 in relation to the front end of the bearing 60 a spacer 66 is used. This may be stamped from sheet metal to have a flange fitting inside of member 63 and another flange to fit over the end of casting 60 which may be machined to receive it. The fan spider 65 has a plurality of punchings 67 cut and bent out from its surface at a plurality of points around the circumference to fit over the end of the hub 63 and thus align the fan blades with the pulley. In this modification three gaskets would be necessary to prevent leakage of oil being located between the junction of the flanges of the bearing members 59 and 60, and between the flanges of these bearing members and the cup shaped members 62 and 63 which parts are joined together by means of bolts 44.

Figure 7:
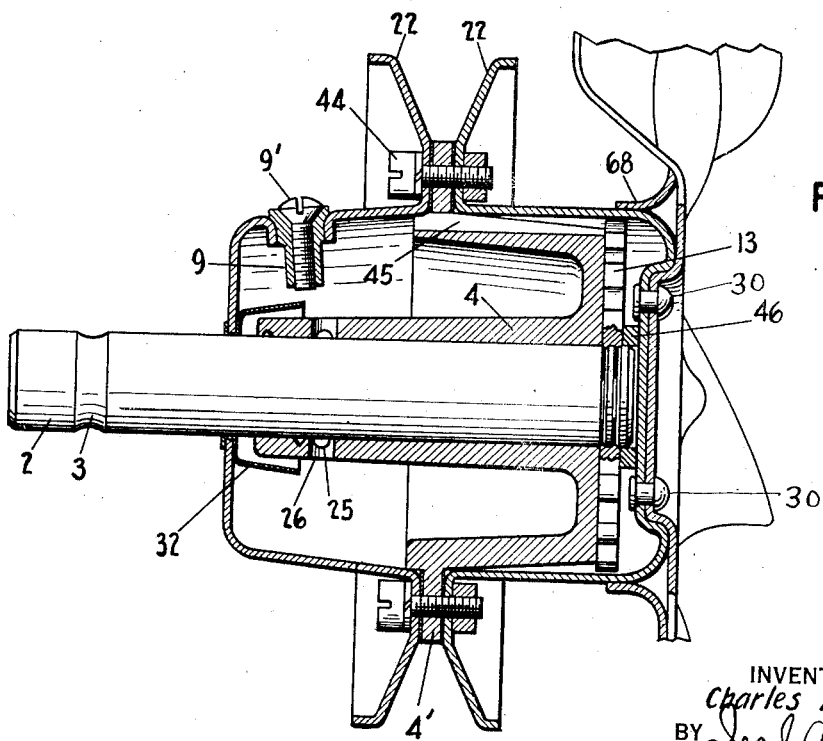
Fig. 7 is a modification showing still further means for securing the inner bearing to the outer hub member as well as different means for centering the fans on the hub.

Fig. 7 differs from the modification in Fig. 4 by connecting the central flange of the bearing casting 4' with the end of the bearing 4 instead of with the middle. The front pulley stamping has a recess somewhat similar to that shown in Fig. 3 and in this correspondingly fits a protuberance stamped from the fan spider. Also from the spider or from the blades is punched lugs 68 so as to fit over the front pulley hub to further accurately position the fan blades. In this case a thrust washer 46 is used somewhat similar to that shown in Fig. 4. The operation of this fan as far as oiling features are concerned will be understood from the description of previous features.

The various features disclosed may be combined in other ways than that shown in the drawings. Instead of using a spider I may employ cross fan blades, one being punched as at 68 and with a central protuberance to fit in the cup shaped recess of the housing. The other cross blades may be stamped to fit in the central stamping of the first cross blade and may also have the positioning lug 68 if desired.

Various modifications may be made without departing from the spirit of my invention.

Having described my invention, what I claim is:

1. The combination of two oppositely positioned cup shaped stampings, circular flanges extending outwardly from the rims of said stampings towards their bases, one of said stampings having a central hole in its base, a bearing member having an outwardly extending flange, means for clamping the first mentioned flanges together with the second mentioned flange therebetween to form a pulley with a belt groove between the first mentioned flanges and with a lubricant containing hub, a shaft extending through said hole and into said bearing, and means for holding the shaft in the bearing.

2. The combination of two oppositely positioned cup shaped stampings, circular flanges extending outwardly from the rims of said stampings and towards their bases one of said stampings having a circular hole in its base, a bearing member having a flange with a recess extending at right angles to the axis of the bearing means for clamping said stampings on each side of the flange of said bearing member, a shaft in said bearing having one end extending through said hole, means functioning with said shaft and located in said recess for forcing oil from said chamber and around that portion of the shaft within said bearing.

3. The combination of a shaft, a bearing member around said shaft having an intermediate flange with a recess therein, a pulley hub enclosing said bearing to form a lubricant chamber, pulley flanges positioned over the first mentioned flange, and means within said recess for drawing oil from said chamber and forcing it around the shaft within the bearing.

4. The combination of a bearing member having a flange, cup shaped stampings oppositely faced and secured to said flange to form a lubricant chamber, said stampings having oppositely flaring rims to form a pulley groove therebetween, said flange having an opening to permit the passage of lubricant from one side of the flange to the other.

5. In fans, a cylindrical hub closed at one end and having an axial hole at the other end, said hub being adapted to contain a lubricant for said bearing, a bearing member in said hub and attached thereto, a stub shaft journalled in said bearing and extending through said hole, and fan blades riveted to the closed end of said hub through holes located inside the annulus of lubricant formed through rotation of said hub.

6. In fans, two oppositely positioned cup shaped stampings, circular flanges extending outwardly from the rims of said stampings and towards their bases, one of said stampings having an axial hole in its base, a bearing member having a circular flange, means to secure the last mentioned flange between the first mentioned flanges with the center of the bearing member in line with said hole said circular flanges forming a belt groove therebetween.

7. In fans, two oppositely positioned cup shaped stampings, circular flanges extending outwardly from the rims of said stampings and towards their bases, one of said stampings having an axial hole in its base, a pair of hubbed discs having their hubs extending in opposite directions axially of said hole, and means to secure said discs between said flanges.

8. In fans, two oppositely positioned cup shaped stampings, circular flanges extending outwardly from the rims of said stamps and towards their bases one of said stampings having an axial hole in its base, a pair of discs secured between said flanges and spaced apart radially below the flanges to form a slit, said discs having holes adjacent the inside surface of said cup shaped stampings, bushings joined to the outer sides of said discs and spaced from the inner circumference of said stampings to form a lubricant chamber, a stub shaft extending through said hole and into said bushings, a disc member secured to said shaft and housed in said slot, said disc member having means for drawing oil through the second mentioned holes and forcing it around the shaft inside said bushings.

9. In fans, two oppositely positioned cup shaped stampings, circular flanges extending outwardly from the rims of said stampings and towards their bases, one of said stampings having an axial hole in its base, a pair of discs secured between said flanges and spaced apart radially below the flanges to form a slit, said discs having holes adjacent the inside surface of said cup shaped stampings, bushings joined to the outer sides of said discs and spaced from the inner circumference of said stampings to form a lubricant chamber, a stub shaft extending through said hole and into said bushings, a disc member secured to said shaft and housed in said slot, said disc member having means for drawing oil through the second mentioned holes and forcing it around the shaft inside said bushings, and a flaring skirt secured in the first mentioned hole to prevent oil from leaking therethrough.

10. The combination of two cup-shaped members, a central bearing member having a flange means for attaching the open ends of said cup-shaped members on opposite sides of said flange to form a lubricant chamber, two of said members having oppositely slanting flanges to form a belt groove therebetween when assembled with the other member.

CHARLES HOLLERITH.